(No Model.)
A. C. CREHORE.
ELECTRICAL RECORDING APPARATUS.
No. 548,700. Patented Oct. 29, 1895.
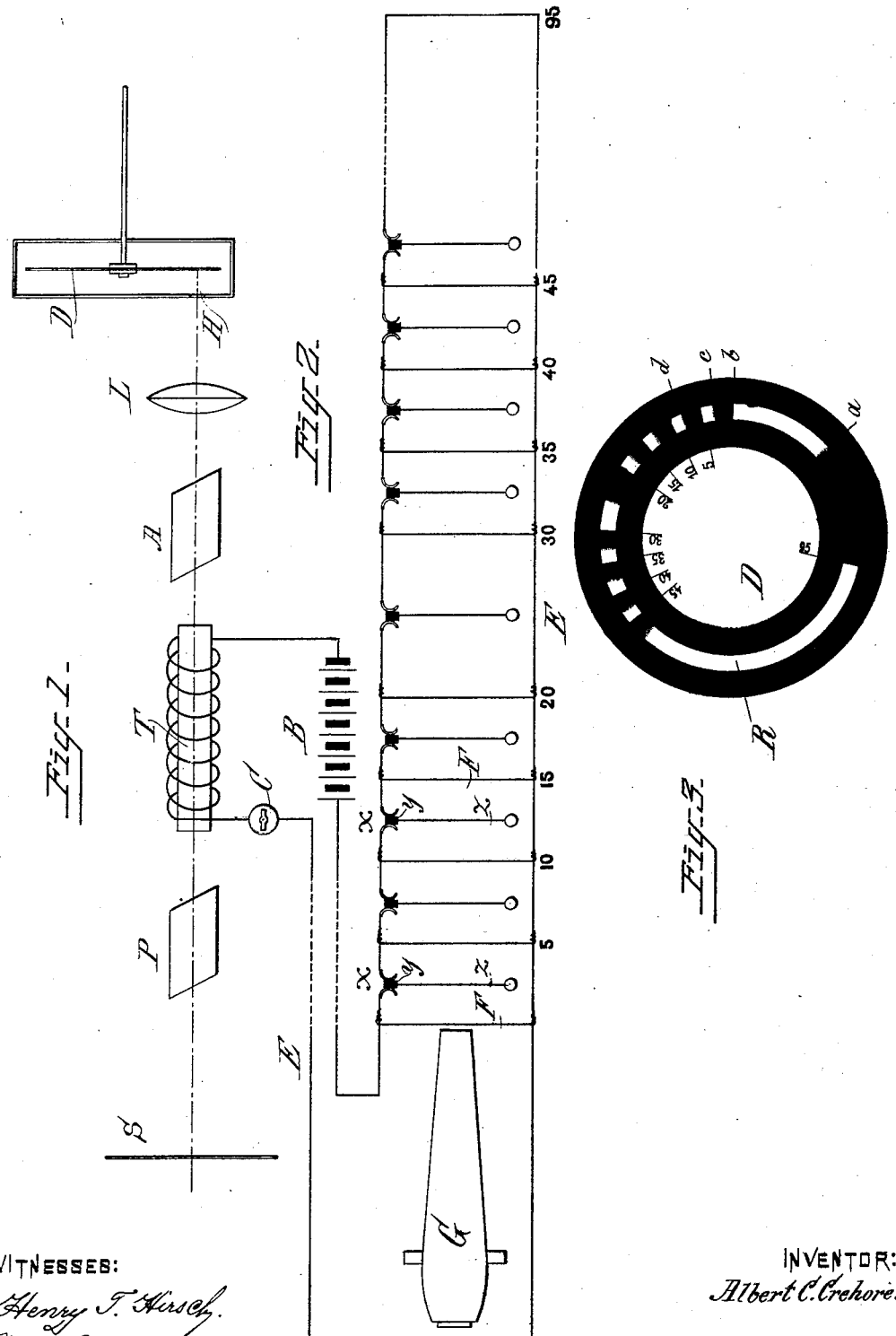
WITNESSES:
Henry T. Hirsch
Wm. H. Capel
INVENTOR:
Albert C. Crehore.
by J. C. Townsend
ATTORNEY.

UNITED STATES PATENT OFFICE.

ALBERT CUSHING CREHORE, OF HANOVER, NEW HAMPSHIRE.

ELECTRICAL RECORDING APPARATUS.

SPECIFICATION forming part of Letters Patent No. 548,700, dated October 29, 1895.

Application filed April 8, 1895. Serial No. 544,837. (No model.)

*To all whom it may concern:*

Be it known that I, ALBERT CUSHING CREHORE, a citizen of the United States, and a resident of Hanover, in the county of Grafton and State of New Hampshire, have invented a certain new and useful Electrical Recording Apparatus, of which the following is a specification.

My invention relates to electrical recording apparatus whereby the occurrence of incidents or events at fixed or variable intervals may be made a matter of record.

The main object of the invention is the production of a device which will be capable of performing the functions of such well-known apparatus as the Morse register, the Thomson siphon recorder, and chronographs wherein by the aid of the electric current a record is made by a magnetically-controlled stylus or by the action of an electric spark.

Another object of the invention is to adapt such device to the purpose of measuring the velocity of moving bodies, such as projectiles. In such a device it is essential that the production of the record should follow instantly upon the occurrence of the event; but in most of those heretofore constructed it has been necessary to put into motion some ponderable object, such as the stylus in a Thomson siphon recorder, thereby causing an appreciable interval between the occurrence and the recording thereof, or the record produced has not been sufficiently clear to enable computations to be accurately made therefrom.

In my device a beam of light is the active recording agent, an imponderable means requiring no appreciable time to bring it into action. This beam of light is caused to fall upon a sensitized plate, where its persistence and interruptions are clearly recorded. Then to manipulate this beam without employing a ponderable shutter I polarize said beam and, by rotating its plane of polarization through the aid of a magnetic field, produce interruptions therein, as desired. This magnetic field might be produced and presented to and withdrawn from the medium affected thereby in any suitable way, but that deemed most desirable consists in placing an electric coil or coils about said medium and creating and withdrawing the field by making and breaking the circuit of the coil or coils. Such recording-instrument may then be adapted to any use wherein it is desired to make a record of the makes and breaks in an electric circuit, and by the proper uniform relative movement being given to the beam and the sensitized plate the exact relation of the makes and breaks will be recorded. From makes and breaks produced the meaning of the photograph produced the meaning of the interruptions in the circuit may be ascertained, and from the relation between said uniform movement and the reproduced interruptions of the beam of light the time between interruptions may be readily computed. Then should such interruptions be caused by a moving body breaking and making the controlling-circuit the velocity of such body could be easily and accurately determined.

My invention, therefore, consists in the combination, with a polarizer and an analyzer, of a medium acting under the influence of a magnetic field to rotate the plane of polarization and photographic apparatus for producing a record of the variations in said beam resulting from the rotation of the plane of polarization.

My invention also consists in the combination, with means for polarizing a beam of light, of a medium interposed in said beam and acting, when in a magnetic field, to rotate the plane of polarization, thereby causing an interruption in the beam of light, an electric circuit controlling the effect of said field in response to pulsations or to makes and breaks in the circuit, and photographic apparatus for producing a record of the interruptions in the beam of light.

My invention also consists in the combination, with apparatus for producing an interruption in a ray of light, of means for photographing the presence of the ray, an electric circuit co-operating with said apparatus and extending along the path of a moving body, and means operated upon by said body in its movement for controlling said circuit.

My invention further consists in the construction, arrangement, and combination of parts, as hereinafter fully set forth in the description, and pointed out in the claims.

In the drawings which accompany this specification and form a part thereof, Figure 1 diagrammatically represents the apparatus employed to polarize, interrupt, and photograph a beam of light. Fig. 2 represents diagrammatically an arrangement of circuits cooperating with said apparatus for effecting interruptions in the beam of light, as by the action of a moving body whose velocity is to be measured. Fig. 3 represents graphically a photograph of a repeatedly-interrupted ray of light.

As above set forth, my invention may be applied to the production of a record of any incident or occurrence which can effect the flow of current over an electric circuit. The makes and breaks or other variations in the flow of such current may be produced manually or automatically, as the circumstances of the application of the invention may require. I will describe my invention, however, as applied in the measurement of the velocity of a rapidly-moving body, such as a projectile, as it has already been adapted to this purpose with complete success.

In the drawings, S represents the screen, provided with an opening of suitable size to admit the necessary ray or beam of light from some powerful source, as the sun or an arc lamp.

P and A represent Nicol prisms acting, respectively, as polarizer and analyzer. Between P and A may be located any suitable agent or medium possessing the property of rotating the plane of polarization of a beam of light by the action of a magnetic field. For this purpose I have shown at T a tube containing liquid bisulphide of carbon, which answers the purpose perfectly.

L is a lens, and D is a rotary disk for supporting a sensitized film or plate. This disk is mounted in a dark-box provided with a suitable slit, as at H, and may be rotated by any power which will produce a constant uniform movement. Any other manner or means may be employed for photographing or recording the persistence of the ray. This part of the apparatus may be located in any suitable building in the locality of the place where the object travels whose velocity is to be measured, as in the laboratory at the proving-grounds, in the case of measuring the velocity of a projectile.

Another part of the laboratory apparatus is the means for producing a magnetic field about the polarizing agent at T, which in the present instance is a coil or coils of insulated wire surrounding the tube T. These coils are in the electric circuit E, extending to and forming part of the mechanism located on the proving-ground. In the circuit is a battery or other suitable source of current indicated at B and a switch indicated at C.

On the proving-ground is the gun G, the velocity of whose projectile is to be determined. The circuit E is extended along each side of the path of the projectile, and cross or shunt connections F are placed in the path of the projectile at stated intervals, so that as the projectile travels it may break or interrupt the current in one after the other of said connections. Between the adjacent connections F, which simply typify any means of breaking or interrupting the flow of current over the circuit, are placed suitable devices for re-establishing the circuit. One means devised for this purpose consists of a pair of springs located in one side of the main circuit E, as at $x$, which are normally held apart by a plug of insulation $y$, from which a suitable connection $z$ extends into the path of the projectile. Such connection may consist of a wire attached at its free end to a suitable weight or to some fixed object, so that as the projectile strikes the wire the plug will be pulled from between the springs $x$ and the circuit closed at that point.

In setting up the laboratory apparatus the polarizing agent or medium prism P, which may be of any suitable substance for producing plane polarization, is placed in the beam of light admitted through the opening in screen S. Then some medium by which the plane of polarization may be rotated—say, bisulphide of carbon—is placed in the path of the polarized ray. The bisulphide of carbon has the peculiar property of rotating the plane of polarization when placed in a magnetic field. The coil about the tube T produces such a field, and as current is turned on and off said coil the said plane is rotated back and forth. This effect may also be produced by increasing and decreasing the flow of current within fixed limits. Then some suitable analyzing medium—analyzer A—is placed in the beam of light emerging from said tube and rotated about its horizontal axis until the light passing through it is completely extinguished and then fixed in that position, said to be "crossed." The lens L may be interposed to concentrate the rays of light upon the plate D, but it is not essential. The switch C may be located in the laboratory or on the proving-ground, as desired. The sensitized plate is indicated as having a rotary motion, but its motion may be of any sort, provided the law thereof is known and points upon the plate have a definite known time of passing the opening.

The operation is as follows: As soon as the current is turned on, its passage through the coil causes light to appear through the analyzer and to persist so long as the current is on. Then upon the firing of the gun the projectile cuts the wire F at the muzzle and so interrupts the current, causing the light through A to completely vanish. When the projectile arrives at $z$, the plug $x$ will be pulled out, allowing the circuit to be made again and current to flow over the next cross connection F. This makes the light appear again on the plate, to be again suddenly cut off when the projectile cuts the next wire F, and again caused to appear as the projectile pulls the next plug $x$, and so on, causing a number of makes and breaks in the beam of light and thereby recording the intervals between different positions of the projectile. If the photographic plate is revolved, the circle of light produced thereon is interrupted at intervals and by the angle through which the plate turns from one interruption to another the time, and from it the velocity of the projectile is measured.

By the diagram in Fig. 3 is represented the photograph produced by the operation of the above-described apparatus in measuring the velocity of a projectile traveling the path as represented in Fig. 2. The broken ring R represents the reproduction of the intermittent beam of light. The disk D having been started in its rotation and having acquired a uniform rotation of, for instance, twelve or thirteen turns a second, the slide was drawn, as at $a$, the wire F at the muzzle cut by the projectile, as at $b$, the first plug drawn, as at $c$, the second wire, five feet from the muzzle, cut, as at 5, the second plug $y$ drawn, as at $d$, the third wire F, ten feet from the muzzle, cut, as at 10, and so on, interrupting the circuit at fifteen, twenty, thirty, thirty-five, forty, forty-five, and ninety-five feet, respectively, from the muzzle of the gun, said circuit being made between the breaks, as set forth. From the photographic record of the breaks in the circuit, which produce sharp lines, as indicated, the velocity of the projectile during any interval can be accurately determined. By this means the fact was proven that the velocity of a projectile increases during the first five or ten feet after leaving the muzzle.

Obviously the analyzer may be placed in the open position and the coil included in a normally-closed circuit to produce darkness and light be admitted through the analyzer on opening the circuit. Aside from these there are many changes that may be made in the selection, arrangement, and combination of parts for carrying out my invention, and I do not, therefore, limit myself to those specifically mentioned and described.

Polarizing a beam of light and rotating the plane of polarization by the action of a medium interposed between the polarizer and analyzer and subjected to the action of a magnetic field were matters of laboratory experiment with Faraday, and this part of the apparatus is not claimed by me.

What I claim as my invention is—

1. The combination with apparatus for polarizing a beam of light, of a medium interposed in said beam and acting in a magnetic field to rotate the plane of polarization, an electric circuit for controlling the magnetic field, means for breaking and making said circuit, and photographic apparatus for producing a clearly defined record of the interruptions in the beam of light and thereby of the breaks in the electric circuit, substantially as set forth.

2. The combination of a polarizer, an analyzer, a medium such as described placed between them and adapted to rotate the plane of polarization under the influence of a magnetic field, an electric circuit for producing such magnetic field, a circuit controlling device in said circuit for producing sudden interruptions thereof at certain intervals thereby interrupting the beam of light, and a photographic recorder in the path of the beam of light emerging from the analyzer, said recorder and beam of light moving relatively to one another to produce a clearly defined image of the interruptions in said beam.

3. The combination with a photographic recording apparatus, having a moving sensitized plate, of means for directing a beam of light thereto, an electrically controlled device for successively interrupting said beam, an electric circuit extending from said device along the path of a moving body, and devices along the path of said body whereby arranged in the path of said body whereby the circuit is operated upon at fixed intervals as the body moves along, for the purpose set forth.

4. The combination with the electrically controlled recording apparatus for the purpose described, of a gun, an electric circuit leading from said apparatus along the path of the projectile, cross or shunt connections placed in said path at fixed intervals, and circuit controlling devices located between adjacent connections and provided with operating means in the path of the projectile.

Signed at Hanover, in the county of Grafton and State of New Hampshire, this 5th day of April, A. D. 1895.

ALBERT CUSHING CREHORE.

Witnesses:
HENRY J. WESTON,
HENRY O. BLY.